(12) United States Patent
Le Pennec et al.

(10) Patent No.: US 7,716,369 B2
(45) Date of Patent: May 11, 2010

(54) DATA TRANSMISSION SYSTEM WITH A MECHANISM ENABLING ANY APPLICATION TO RUN TRANSPARENTLY OVER A NETWORK ADDRESS TRANSLATION DEVICE

(76) Inventors: Jean-François Le Pennec, 11, chemin de la Séréna, 06100 Nice (FR); Aurélien Bruno, Le Colbert, 23 boulevard de Magnan, 06200 Nice (FR); Nicolas Grisi, Bastide de l'Abbaye, 13 boulevard Honoré Teisseire, 06480 La Colle sur Loup (FR); Jean-Marie Sommerlatt, 412, chemin des Trigans, 06640 St Jeannet (FR); Bernard Amadei, 5, allée des Pruniers, 06800 Cagnes sur Mer (FR)

( * ) Notice: Subject to any disclaimer, the term of this patent is extended or adjusted under 35 U.S.C. 154(b) by 1004 days.

(21) Appl. No.: 10/638,504

(22) Filed: Aug. 11, 2003

(65) Prior Publication Data

US 2004/0205245 A1 Oct. 14, 2004

(51) Int. Cl.
*G06F 15/16* (2006.01)
(52) U.S. Cl. ...................................... 709/245
(58) Field of Classification Search ................... 709/245
See application file for complete search history.

(56) References Cited

U.S. PATENT DOCUMENTS

| | | | | | |
|---|---|---|---|---|---|
| 5,922,049 | A | * | 7/1999 | Radia et al. | 709/220 |
| 6,055,236 | A | * | 4/2000 | Nessett et al. | 370/389 |
| 6,128,657 | A | * | 10/2000 | Okanoya et al. | 709/224 |
| 6,981,278 | B1 | * | 12/2005 | Minnig et al. | 726/12 |
| 7,133,404 | B1 | * | 11/2006 | Alkhatib et al. | 370/392 |
| 2002/0042875 | A1 | * | 4/2002 | Shukla | 713/151 |
| 2003/0028610 | A1 | * | 2/2003 | Pearson | 709/213 |
| 2003/0031165 | A1 | * | 2/2003 | O'Brien, Jr. | 370/352 |
| 2003/0084162 | A1 | * | 5/2003 | Johnson et al. | 709/227 |
| 2003/0112823 | A1 | * | 6/2003 | Collins et al. | 370/474 |
| 2003/0200318 | A1 | * | 10/2003 | Chen et al. | 709/227 |

(Continued)

OTHER PUBLICATIONS

M. Borella et al., RFC 3102—Realm Specific IP: Framework, Oct. 2001, http://www.faqs.org/rfcs/rfc3102.html.*

(Continued)

*Primary Examiner*—Joon H Hwang
*Assistant Examiner*—John M MacIlwinen

(57) ABSTRACT

Data transmission system based upon the Internet protocol (IP) comprising a private transmission network (18) and a public transmission network or the like (16) interconnected by a network address translation device NAT (12) wherein at least a workstation WS (10) connected to said private transmission network has to establish a communication with a peer device (14) connected to the public transmission network, the local IP address of each data packet from the workstation WS being translated into a NAT address used to provide the route through the public transmission network. The system includes a registration server (19) connected to the public transmission network for registering the local IP address corresponding to the NAT address and providing the correspondence between the NAT address and the local IP address to the peer device in order for this one to replace in the IP header of each data packet received by the peer device, the NAT address by the local IP address.

8 Claims, 5 Drawing Sheets

U.S. PATENT DOCUMENTS

2003/0212795 A1* 11/2003 Harris et al. ................ 709/227
2004/0024879 A1* 2/2004 Dingman et al. ............ 709/227
2004/0030765 A1* 2/2004 Zilbershtein et al. ........ 709/223

OTHER PUBLICATIONS

G. Montenegro, RFC 3104—RSIP Support for End-to-end IPsec, Oct. 2001, http://www.faqs.org/rfcs/rfc3104.html.*

B. Patel et al., RFC 3193, Securing L2TP using IPsec, Nov. 2001, http://www.faqs.org/rfcs/rfc3193.html.*

M. Borella, Protocol helps strech IPv4 addresses, Network World, Jan. 17, 2000.*

* cited by examiner

DATA TRANSMISSION SYSTEM WITH A MECHANISM ENABLING ANY APPLICATION TO RUN TRANSPARENTLY OVER A NETWORK ADDRESS TRANSLATION DEVICE

TECHNICAL FIELD

The invention relates generally to a IP network environment between a workstation connected to a private network and a peer device connected to a public network wherein the two networks are interconnected by a network address translation device and relates particularly to a data transmission system comprising a mechanism enabling any application to run transparently over a network translation device.

BACKGROUND

In a system wherein a workstation connected to a private network using Internet Protocol (IP) wants to communicate with a peer device connected to a public network also using IP protocol, a network address translation (NAT) or a network port address translation (NPAT) when several ports are used, is implemented at the network boundary to change the IP address and possibly the port value of each data packet.

But some applications are not compatible with the NAT function. Thus, in secure VPN using IPsec for example, the Security Association (SA), which is the method for creating a secure link, is established between the two end-points that will need a secure IPsec tunnel between them. These end points are not necessarily on the same network and devices in between such as firewalls or gateways use the NAT on the local IP address in order to provide routability. Once "NATed", the SA or IPsec packets may not be recognized by the other end since the packets may contain the original IP address, may include a signature including the original IP address_or may not have the a valid port number.

Other protocols such as FTP, IRC, SNMP, LDAP (Internet Engineering Task Force protocols) or H.323 (International Telecommunication Union protocol) are also totally or partially incompatible with the NAT mechanism insofar as the source IP address of the header is different from the address transported with the data payload. That is the case with the protocol H.323 used in transporting voice over IP (VoIP) and where a proxy function is often required in gateways.

NAT was originally developed as a short-term measure to combat Ipv4 address exhaustion. However, widespread implementation and lengthy migration to Ipv6 have made it impossible for IPsec vendors to ignore NAT. Cisco, Check-Point, F-Secure, Microsoft, and SSH Communications are among those vendors working to enable IPsec NAT traversal.

The Internet Engineering Task Force (IETF) has been working protocol by protocol to find solutions. But these are generally difficult to implement and do not solve all the cases. NAT traversal standard is one IETF example but a few problems still remain.

When the NAT or NPAT device in the middle is not under control, no special mechanism can be implemented to allow pass-through for the various protocols having problems with NAT/NPAT. Only encapsulation of all the related flow over a dedicated encapsulation mechanism (generally based on UDP) between end peers may be used. This adds complexity and overhead and implies generally a change on the application or system.

SUMMARY OF THE INVENTION

Accordingly, the main object of the present invention is to provide a data transmission system having a seamless and generic mechanism for enabling applications not compatible with the network address translation (NAT) or the network port address translation (NPAT) function to run transparently without adding any overhead and without limiting performance.

The invention relates therefore to a data transmission system using Internet protocol (IP) comprising a private transmission network and a public transmission network or the like interconnected by a network address translation device NAT wherein at least a workstation (WS) connected to the private transmission network has to establish a communication with a peer device connected to the public transmission network, the local IP address of each data packet from the workstation WS being translated into a NAT address used to provide the routability through the public transmission network.

The system includes a registration server connected to the public transmission network for registering the local IP address corresponding to the NAT address and providing the correspondence between the NAT address and the local IP address to the peer device in order for this one to replace the NAT address by the local IP address in the IP header of each data packet received by the peer device.

According to another aspect, the invention relates to a method for enabling any application to run transparently in the above data transmission system, the method comprising the steps of registering (REG) in a registration server the local IP address corresponding to any NAT address, requesting from the peer device (REQUEST) to the registration server the local IP address corresponding to any unknown NAT address of a received data packet, getting back, in the peer device, the local IP address from the registration server, and replacing, in the peer device, the NAT address of a received data packet with the local IP address.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
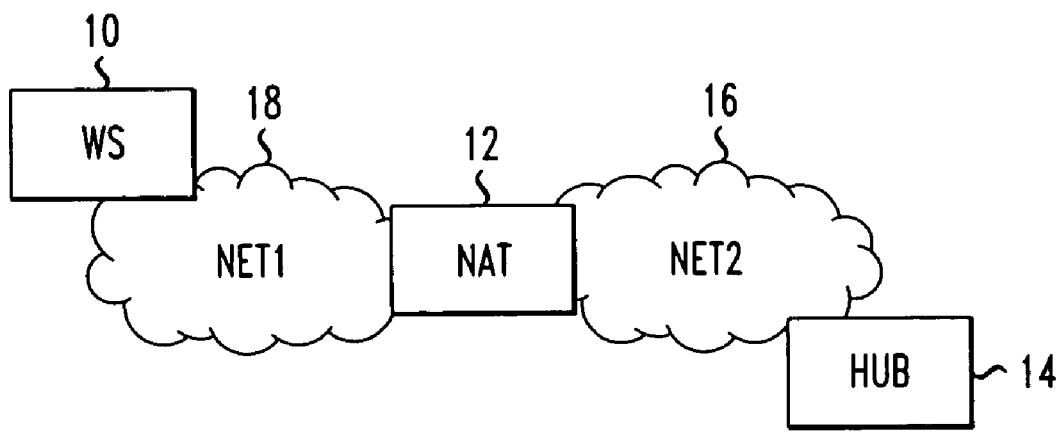
FIG. 1 is a schematic representation of a data transmission system according to the invention.

In reference to FIG. 1, a data transmission system wherein the invention can be implemented includes a first private network NET1 18 to which is connected a workstation 10 and a second network NET2 16 which is generally a public network such as the Internet network or the like to which is connected a hub 14. Assuming that workstation 10 needs to establish a communication with hub 14, it is necessary that the two networks are interconnected by a network address translation (NAT) 12 which performs just the address translation if a dedicated NET2 address can be assigned to workstation 10 for all communications with NET2 devices or by a network port address translation (NPAT) when a NET2 address is shared by more than one device located on NET1 18, such as for example several workstations like workstation 10.

Figure 2:
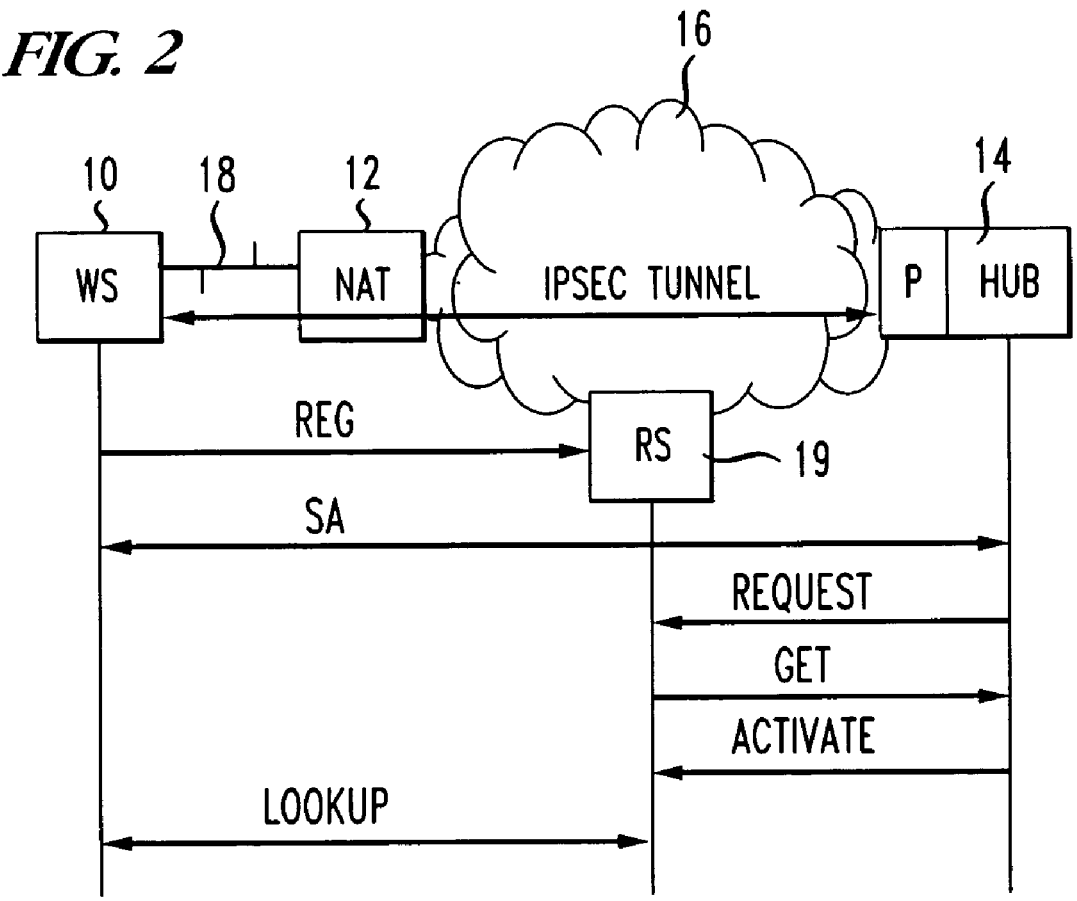
FIG. 2 is a representation of an embodiment of the invention wherein the invention is implemented with an IPsec tunnel.

Some applications or tunneling protocols cannot work in the model of FIG. 1. Thus, with an IPsec tunnel as illustrated in FIG. 2, it is judicious to use a registration server 19 connected to NET2 16 as described hereafter. The IPsec tunnel is established between workstation 10 and hub 14 with a NAT device 12 between private network 18 and NET2 16 for performing at least address translation. For example, a user in a hotel may be joining his Intranet network. Note that hub 14 includes a proxy P, the function of which will be described later.

According to a first aspect of the invention, only a NAT mechanism is implemented. First of all, in a registration step (REG), the local IP address and the NAT address (WAN address) are stored together with the user identification in the registration server 19. There are several ways for the workstation to obtain the value of the registered IP address assigned by NAT device 12. A first way is to use a web browser to communicate with a web server on NET2 16 to provide the source IP address detected (there are several such servers on the Internet). According to a second way, registration server 19 can itself detect the source IP address value in the IP header of the REG message transmitted from workstation 10 to registration server 19, except if another NAT device is located between NAT device 12 and registration server 19. The first way is preferable insofar as, in the second way of doing, it is necessary to analyze the IP header of the REG message.

Generally, registration (REG message) should be performed to signal the presence of workstation 10 with its local IP address (LAN address). When dynamic IP addresses are used, workstation 10 detects a change and sends a new REG message so that, in such a case, the new registration cancels the previous REG message. This refreshed validation of the workstation's presence is performed by LOOKUP messages between the workstation and the registration server 19 and enable workstation 10 to start connections upon an activation request from the hub through the registration server as described below.

The Security Association (SA) which is the procedure to establish the IPsec tunnel is started from the workstation. Upon detection of an unknown IP source address, hub 14 sends a request (REQUEST) to the registration server 19 looking for the registered address equal to this IP source address of the packet. The registration server authenticates the request and the hub gets back (GET) the necessary information such as the identification and the local address of the user. This enables the SA process and starts an IPsec exchange of data between the workstation 10 and the hub 14.

In the hub 14, the proxy replaces the source IP address in the header of the received packet by the local IP address which was used in NET1 18, so that the IPsec process sees the packets as if the hub was connected to the network NET1.

An additional mechanism enables starting the SA and IPsec tunnel from the hub when needed. But the problem to solve is that the hub does not know the workstation address. Assuming that there is a stateful firewall in the NAT device which prevents flows from starting from the hub side, the IPsec process should start from the workstation side. In order to solve the problem, the hub asks the workstation to start the SA through an activation request (ACTIVATE) posted into the registration server 19. The workstation, when connected permanently, polls the registration server (LOOKUP) so that it detects such a request and can start the session from its side. An alternate is to forward the ACTIVATE message to the workstation if authorized, although this is not often the case when IPsec is active but can be added by a modification of the protocol itself. Note that the need to start again the IPsec session occurs very often insofar as each side, workstation or hub, cuts the session and establishes it again regularly based upon timers.

According to a second aspect, the invention can be implemented when there is a port and address translation (NPAT) being implemented. The first registration step REG is the same as in the above, but a timestamp is set in registration server 19 each time a registration is performed. In fact, a new registration is performed each time a new flow starts from the workstation to the hub. This new flow is characterized by a new port number being used. The port numbers corresponding respectively to the LAN port number and to the WAN port number are transmitted in the REG message and stored by the registration server. For each new flow, the registration server 19 stores the source IP address (WAN address), the source port number (WAN port) and the timestamp further to the corresponding local IP address (LAN address) and the LAN port number. When the hub 14 receives a new flow from NAT device 12, it first sets up a timestamp and then sends the REQUEST message to the registration server and gets back a GET message from the latter corresponding to the most recent or closest timestamps, so that it can correlate to which flow the received packet belongs to by comparing the timestamps. Note that a payload hash value may also be added to the REG message. In such a case, this hash value is a further means for ensuring that the packet being analyzed is really the same. Using only the hash field without the timestamp is also possible.

Finally, the proxy included in the hub replaces the source IP address (WAN address) and the source port number (WAN port) by, respectively, the local IP address (LAN address) and the local port number (LAN Port). It must be noted that the procedure using the ACTIVATE request sent by the hub to the registration server and the regular polling by a LOOKUP message from the workstation to the registration server is used in the same way as in the first case wherein there is no port number to be translated.

Figure 3:
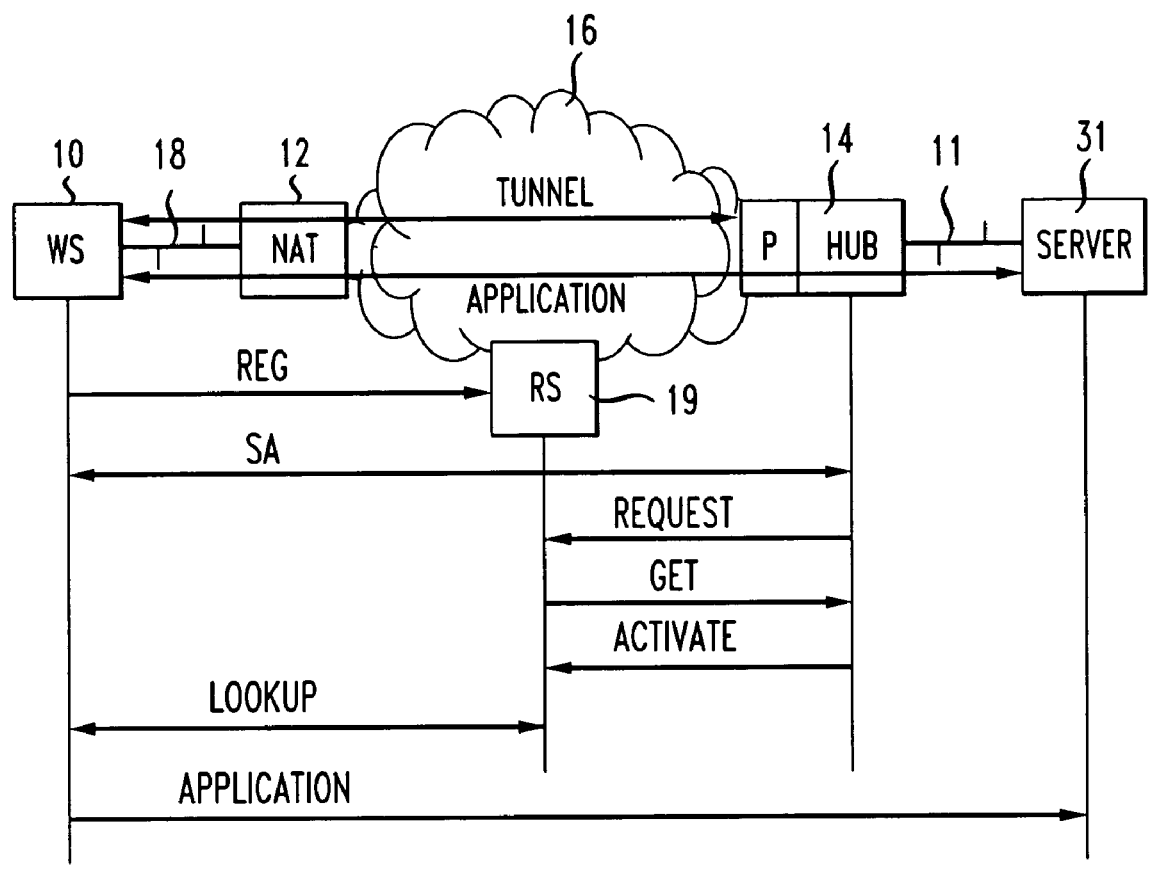
FIG. 3 is a representation of an embodiment of the invention wherein the invention is implemented with the use of an IPsec tunnel within a server application.

In reference to FIG. 3, the invention can also be implemented when a tunnel such as an IPsec tunnel is used as a transport means for an application having a compatibility problem with NAT. In this case, the hub 14 which is the peer device at the end of the IPsec tunnel is connected to a LAN 11.

The communication is established between the workstation 10 and a server 31 connected to the LAN 11. Such an architecture is used when the application server 31 cannot be modified to include a proxy. This is the case when the server 31 is a non-modifiable voice server and the application is based on the H.323 protocol. Furthermore, the advantage of this implementation is that the proxy included in the hub is used for all applications instead of being implemented in each server. However, there is a first constraint insofar as the network 18 (NET1) must be recognized on the LAN 11 in order for packets having NET1 addresses to be correctly routed. This means that hub 14 presents these addresses on local network 11 as if they were their own addresses. Another constraint on the workstation 10 is to show the tunnel as being a valid logical interface even if it is virtual for the operating system and associated applications so that the applications use the tunnel IP address as the local IP address.

The solution illustrated in FIG. 3 enables bypassing the above problem since a tunnel is implemented between WS 10 and hub 14. The Intranet addresses (like addresses from LAN 11) which are the addresses shown by a virtual interface on WS 10 will be used by applications such as VoIP as source addresses. Since the virtual interface is always tunneled, a second source address belonging to NET1 is applied on any outgoing packet.

Finally, since the function is to hide the NAT or NPAT function, the application sees really a communication with a local device on the same network providing full transparency for all applications.

The way the system illustrated in FIG. 3 works is very similar to what is described in FIG. 2 since the tunnel between hub 14 and workstation WS 10 can be an IPsec tunnel or any type of tunnel. The tunneling is required to access a device such as the hub 14 that can perform the address and port swapping at the Intranet side.

Therefore, a packet contains the following fields: a tunnel IP header (NET1 address range), a tunnel header (e.g., IPsec AH or ESP as defined by the IETF), an Inner IP header (used by the application) and the data payload. Arriving at the hub, the tunnel IP header and the tunnel header are removed. The inner IP header is recognized on Local LAN 11 as a hub internal address.

Figure 4:
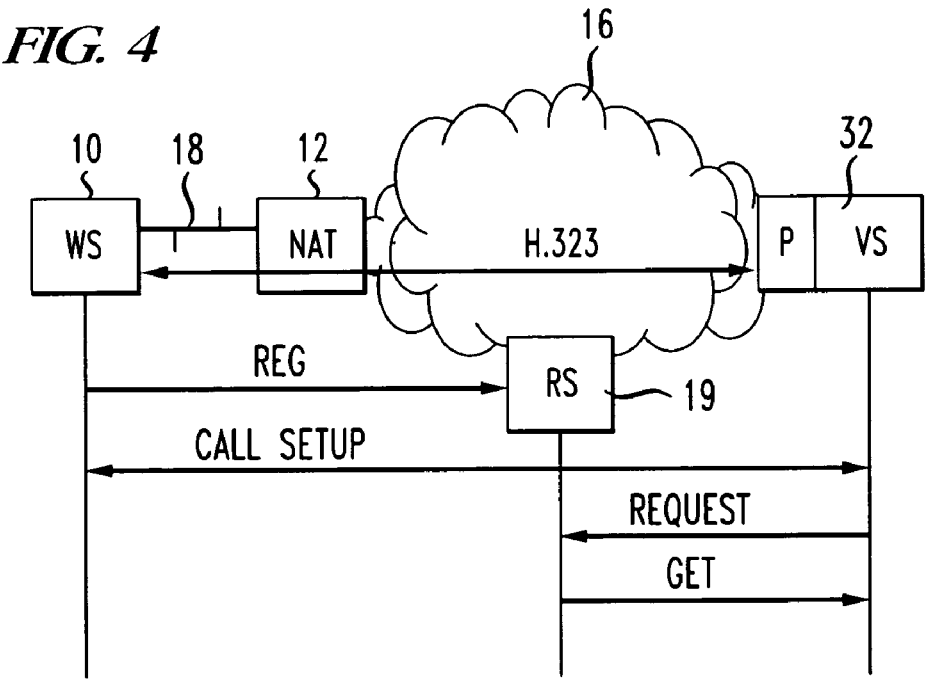
FIG. 4 is a representation of an embodiment of the invention wherein the invention is implemented with the voice over IP protocol.

Referring to FIG. 4, another case where the protocol used for an application is not compatible with the NAT function is the case when H.323 protocol is used for transporting voice over IP. A similar mechanism as the one used in the two preceding embodiments applies to this case, with the procedure CALL SETUP instead of SA for IPsec tunnel and a voice server VS 32 instead of the Hub 14. But the ACTIVATE and LOOKUP procedures are not used here inasmuch as no reconnection has to be performed as in the IPsec tunnel. When a communication is ended, the connection can be disconnected from any side and then re-established from the user side. The ACTIVATE and LOOKUP procedures would be necessary, for example, in case of a stateful firewall preventing a call from being started from the voice server side.

Figure 5:
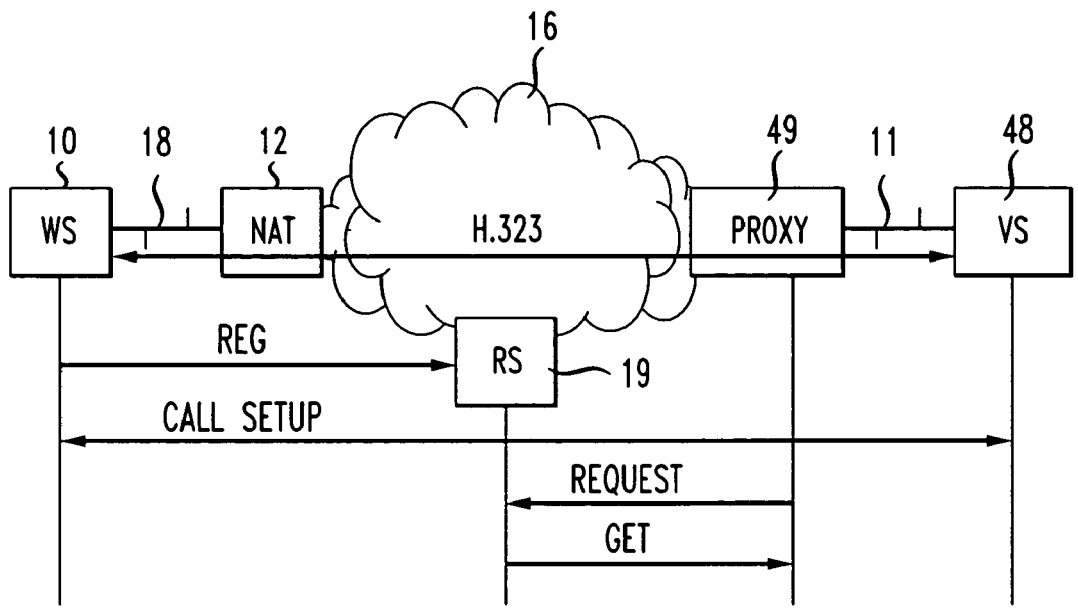
FIG. 5 represents an alternative of an embodiment of the invention illustrated in FIG. 4.

FIG. 5 illustrates the same application using the H.323 protocol as FIG. 4, but with an independent proxy 49 connected to a voice server VS 48. When a proxy is not integrated in the device running the final application as is the case in FIG. 5, the source address for the incoming traffic corresponding to the destination for the outgoing traffic has to be determined in order for this outgoing traffic to be routed to the device running the proxy. This can be done by applying known routing methods such as using predefined subnets for the IP addresses which are given to WS 10. Another method is to use the proxy 49 as the default destination route for all unknown traffic using private addresses not belonging to Intranet. An alternate method when the routing cannot be modified is to build logical tunnels between the proxy 49 and the server 48 such as an IPsec, L2TP (Layer 2 Tunneling Protocol) or GRE (Generic Routing Encapsulation) tunnel. Such a tunnel will force the encapsulated traffic to go back from the server to the proxy.

Figure 6:
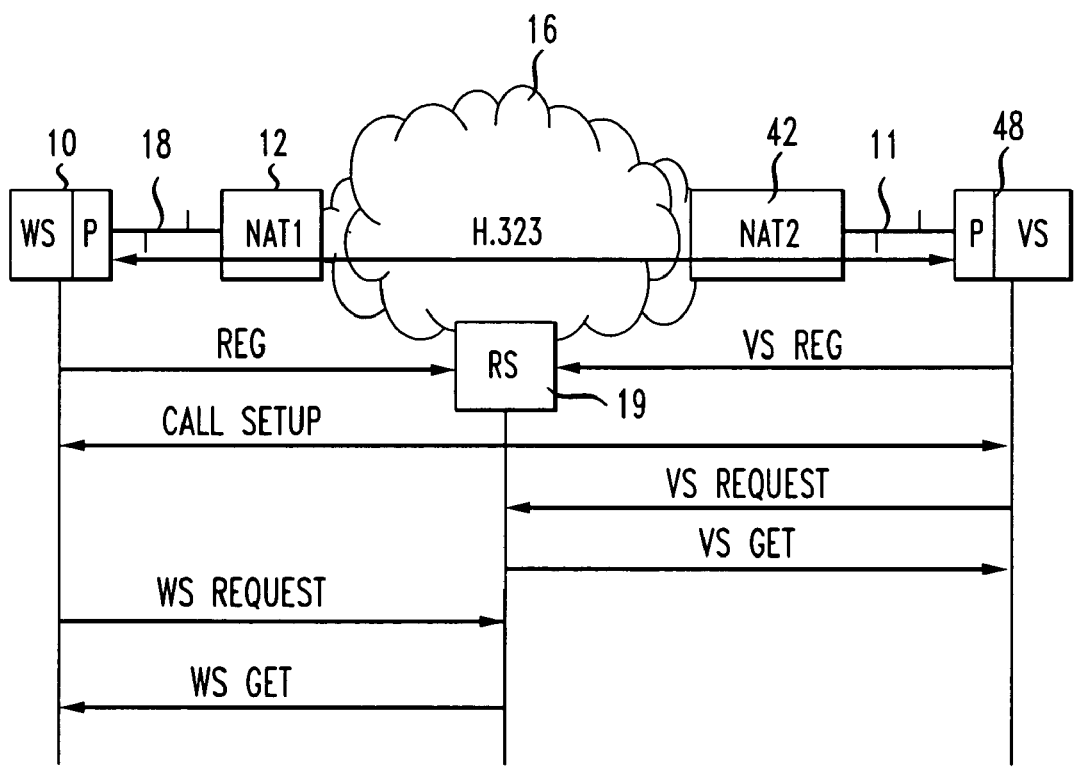
FIG. 6 is a representation of an embodiment of the invention including two NAT devices.

FIG. 6 shows a system wherein another NAT2 device 42 is used at the other end of the network. In this case, the two sides have to register the correspondence between the original address and the NAT address and each peer device must include a proxy to swap the incoming and outgoing IP header fields for the applications requiring this mechanism, such as the H.323 protocol.

Before any communication if only the network address translation is implemented (NAT) or for each flow if network address and port translation (NPAT) is implemented, workstation 10 sends a message WS REG to the registration server 19 for registering the correspondence between the local workstation IP address of the workstation and the NAT address, and server VS 48 sends a message REG to the registration server 19 for registering the correspondence between the server IP address and the NAT2 address.

Assuming that workstation 10 wants to establish a communication with server 48, it has first to send a WS REQUEST to the registration server 19 to receive a GET message including the NAT2 address corresponding to the final address (the server IP address) because no route is defined for this final address. When the packet is received by the server, the proxy included therein has to perform two changes in the IP header and not only one change as defined in the previous embodiments where only one NAT device was present. It has to replace the NAT1 address by the workstation IP address it has obtained by a VS REQUEST and VS GET procedure as explained previously and to replace the NAT2 address by the server IP address which is the address of the server 48 registered on the network (WAN).

A similar procedure as above is applied when a packet is received from the server 48 by the workstation 10. First, the server 48 has to use the VS REQUEST and VS GET procedure with the registration server in order for the proxy to replace the destination address which is the workstation IP address by the NAT1 address. When the packet is received by the workstation 10, the proxy included therein has to use the WS REQUEST and WS GET procedure in order to replace in the IP header of the received packet the NAT2 address by the local source address that is the server IP address and to replace the NAT1 address by the workstation IP address.

Figure 7A:
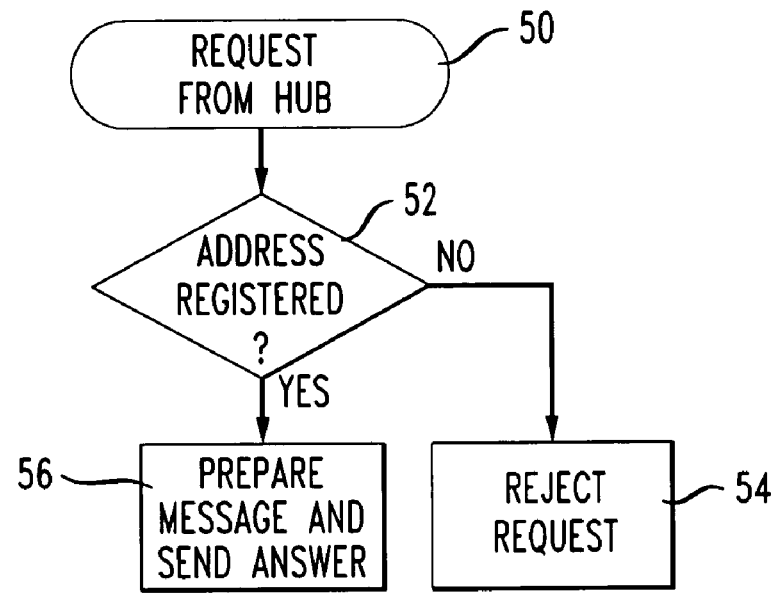
FIGS. 7A and 7B represent respectively the flow chart of the request process and the flow chart of the activate process achieved in the registration server for the implementation of the invention.
Figure 7B:
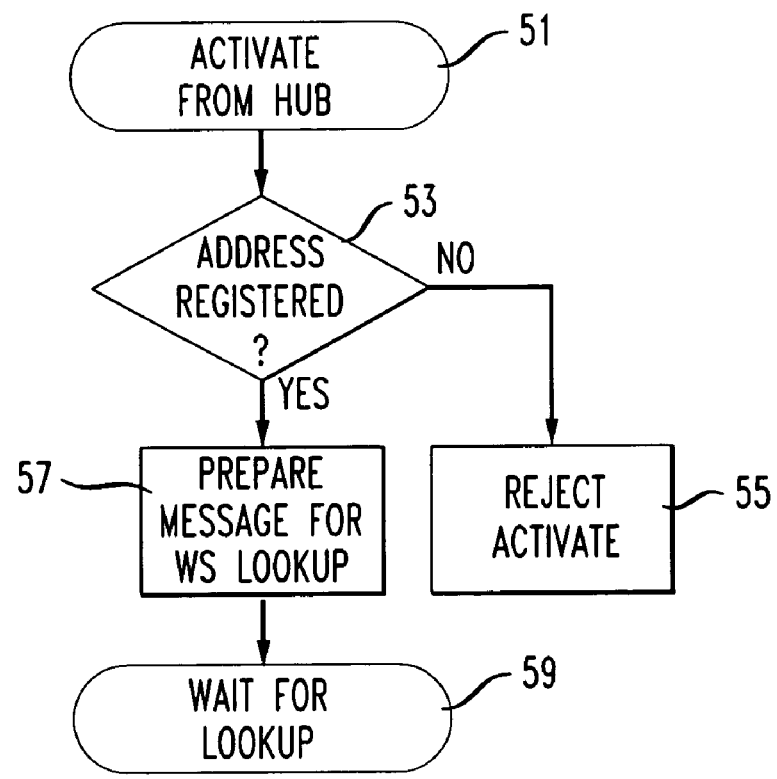

As illustrated in FIGS. 7A and 7B, the steps implemented after the registration procedure REG in the registration server are the REQUEST message from the hub (step 50) and then the determination whether the address of a received packet and optionally the port number have been registered in the registration server (step 52). If not, the request is rejected (step 54). If the address has been registered, all available fields are put in an answering message GET and sent back to the requester (step 56).

As illustrated in FIG. 7B, the ACTIVATE process in the registration server starts when the hub in case of IPsec or the voice server in case of H.323 protocol sends a message to the registration server. This message indicates that this device (hub or server) wants the remote peer device to restart a call or connection. The request is processed and it is determined whether the address of the received message has been registered (step 53). If not, the ACTIVATE request is rejected (step 55). If the address is found, a message is prepared with the ACTIVATE information (step 57) and the registration server waits for the next LOOKUP from the workstation to send the prepared message (step 59).

Figure 8A:
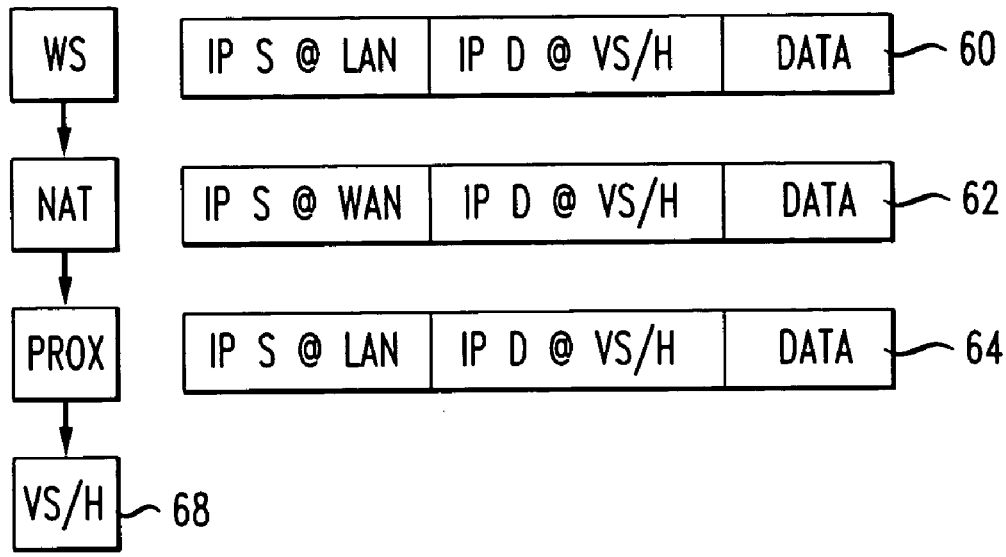
FIGS. 8A and 8B show the contents of the packet modified through the NAT device and the proxy when it is transmitted from the workstation to the peer device and reciprocally.
Figure 8B:
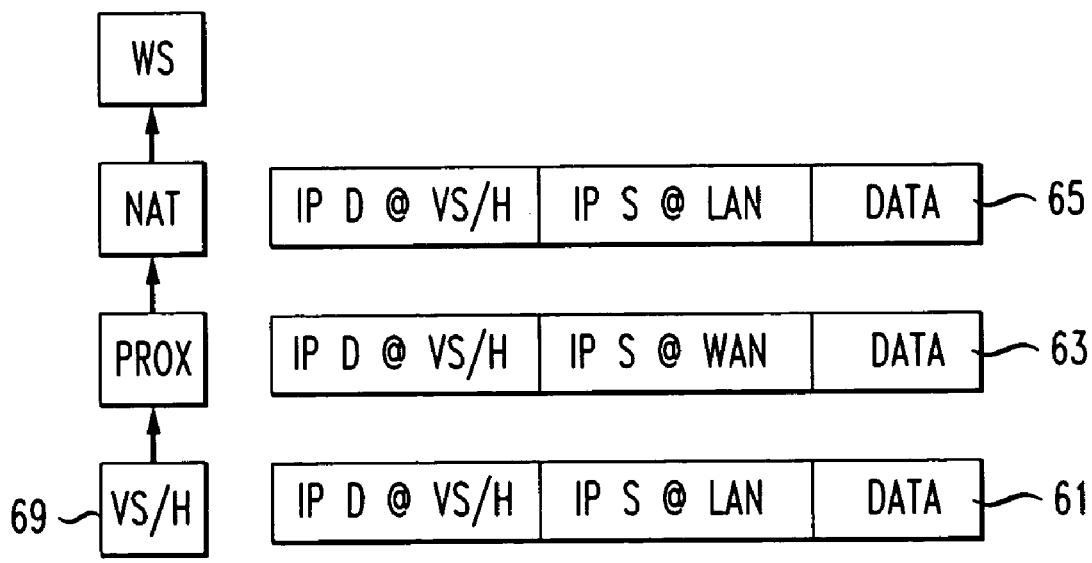

In reference to FIGS. 8A and 8B, the process of swapping according to the invention is similar for any application. FIG. 8A illustrates the transmission from the workstation (WS) to the voice server or the hub (VS/H). A packet (60) sent by WS contains the data payload from the application with some upper layer protocols with an IP header containing a source address being the local workstation address on the LAN and a destination address being the hub or the server on the Intranet side. The path of the flow 68 starts on WS, goes through the NAT device wherein the local source IP address is replaced by a NAT address which is the IP address registered on the WAN (62). When the packet is then received by the proxy, this one gets the destination IP address from the registration server and replaces the WAN address by the local destination IP address or LAN address (64) received from the registration server.

The process of swapping when a packet is sent from the hub or the voice server (VS/H) to the workstation as illustrated in FIG. 8B is the reciprocal of the process illustrated in FIG. 8A. A packet (61) sent by VS/H contains the data payload with the upper layer protocols including a destination address being the local workstation address on the LAN and a source address being the hub or the server on the Intranet side. The path of the flow 69 starts on VS/H and goes through the proxy device wherein the local source address of the workstation is replaced by a NAT address which is the IP address registered on the WAN (63). When the packet is then received by the NAT device, this one changes the NAT address into the workstation address which is the address received from the registration server by using the REQUEST and GET procedure (65).

While this invention has been described in a preferred embodiment, other embodiments and variations can be effected by a person of ordinary skill in the art without departing from the scope of the invention.

The invention claimed is:

1. A method for establishing communication in an arrangement where a workstation is connected to a local area network (LAN), the LAN is connected to a Network Address Translation (NAT) unit, the NAT unit is connected to a public network, and a registration server is also connected to said public network, where the workstation has a LAN address allowing said workstation to accept packets with a destination address corresponding to the workstation's LAN address (WS Local address) and packets emanating from said workstation carry said WS Local address as the packets' source address, the public network routes packets based on the packets' wide area network (WAN) addresses, and the NAT unit accepts a packet from said LAN that arrives at said NAT with a WS Local address as the source address and a destination address corresponding to a WAN address, to substitute said WS Local address with a WAN address of said NAT (NAT WAN address), and to forward said packet to said public network, comprising the steps of:

said workstation sending to said registration server a REG message packet that comprises said WS Local address and WAN address of said registration server;

said NAT passing to said server, via said public network a modified version of said REG message packet, with source address modified in accord with said address substitution performed by said NAT unit, said modified version of said REG message including information about said workstation;

said server storing said information about said workstation;

when, following said step of server storing, a hub that includes a proxy receives from said workstation an initial packet having a source address that is unknown to said proxy;

(1) said proxy accepts said packet and in response thereto sends a REQUEST message to said registration server, specifying at least the source address of the received initial packet;

(2) said registration server responding to said REQUEST message by sending to said proxy a GET message that associates with said NAT WAN address of said initial packet said information about said workstation and said WS Local address;

(3) said proxy modifies the initial packet by replacing said NAT WAN address in the received initial packet with the WS Local address received from said registration server, and forwards the modified packet to remaining portion of said hub; and (4) said hub starts an IPsec exchange of data between said hub and said workstation.

2. The method of claim 1 where the Local address is dynamic, and said workstation sends said REG message more than once.

3. The method of claim 2 where said registration server, when storing said information, also stores a timestamp T1 in association with the stored information, where T1 corresponds to time of said REG message.

4. The method of claim 3 where said step of said proxy sending a REQUEST message includes said proxy setting a timestamp T2 corresponding to time of receipt of said packet, and said REQUEST message includes said timestamp T2; and said step of the registration server responding with said GET message includes in said GET message information that is associated with a timestamp time Ti that is closest to T2.

5. The method of claim 1 where the Local address is dynamic, and said workstation sends said REG message each time a new flow of packets begins.

6. The method of claim 1 where the Local address is dynamic, and said workstation sends said REG message whenever said workstation detects that a Local address of said workstation has been changed.

7. The method of claim 1 where said workstation sends said packet when said workstation wishes to start a session.

8. The method of claim 1 where said workstation sends said packet that begins said communication flow following a poll by said workstation of said registration server that indicates that said hub wishes to start a session.

* * * * *